June 7, 1966 H. M. GREENE, JR 3,254,741

MECHANICAL ESCAPEMENT APPARATUS

Filed July 18, 1963

HOWARD M. GREENE, JR.
INVENTOR.

BY
Nilsson, Robbins & Anderson
ATTORNEYS.

United States Patent Office 3,254,741
Patented June 7, 1966

3,254,741
MECHANICAL ESCAPEMENT APPARATUS
Howard M. Greene, Jr., 13812 Plummer St.,
Northridge, Calif.
Filed July 18, 1963, Ser. No. 295,901
5 Claims. (Cl. 188—90)

The present invention relates to an escapement apparatus for controlling the movement of a mechanical member which results from an applied force; this application is a continuation-in-part of copending United States patent application 196,273, now Patent No. 3,150,754, filed May 21, 1962 and entitled Parking Meter Apparatus.

In various mechanisms and mechanical systems, the need often arises to control the movement of a member as to regulate the speed or position thereof while the member is driven by an applied force. For example, escapement mechanisms to control the movement of a mechanical member while driven by an energy-storing spring, are widely employed in clocks and other timing devices. A controlled rate of movement also occurs for members in various other mechanical energy transmission systems. For example, the transmission of an internal combustion engine must gradually allow the load to be applied to avoid sudden shocks or high loads at low speeds, which might kill the engine. Therefore, the engine gradually receives the load at a controlled rate as energy is supplied to the load.

In various escapement systems wherein movement is controlled, as those examples considered above, a wide variety of mechanisms have been developed. However, in general, these mechanisms are intricate and therefore they are expensive to manufacture and maintain. As a result, a need exists for a simple escapement, e.g., a motion control apparatus, which may be inexpensively manufactured and which is somewhat free from maintenance requirements.

In general, the present invention comprises a system for controlling the movement of a mechanical member by employing a non-Newtonian liquid or damping putty. More specifically, the present invention incorporates a housing wherein a quantity of damping putty is contained, which housing is connected to a mechanical reference. A mechanical apparatus is then placed contiguous to the damping putty and may be connected to another mechanical reference. In various arrangements, a force is applied between the two mechanical references to move the mechanical means relative the housing and the damping putty. The movement is then controlled as desired for various applications e.g., clock, transmissions, and time-delay structures.

An object of the present invention is to provide an improved escapement apparatus.

Another object of the present invention is to provide an improved escapement transmission.

Still another object of the present invention is to provide an escapement mechanism employing a damping liquid which mechanism may be inexpensively manufactured and maintained.

Still a further object of the present invention is to provide a simple and inexpensive time-delay apparatus.

One further object of the present invention is to provide a means for regulating and controlling the movement of the mechanical member through the use of a non-Newtonian liquid or damping putty.

These and other objects and advantages of the present invention will become apparent from a consideration of the following taken in conjunction with the drawings, wherein.

Figure 1:
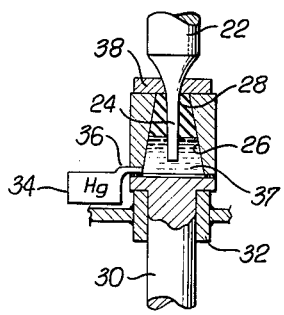
FIG. 1 is a sectional view of an escapement mechanism constructed in accordance with the principles of the present invention.

Referring now to FIG. 1, there is shown a vertical shaft 22 the tapered lower end 24 of which extends into a somewhat cylindrical cavity 26 containing damping putty 28. The cavity 26 is formed in an upper enlarged end of a vertical shaft 30 which is supported in a bearing mount 32.

In general, a rotational mechanical force applied to the shaft 22 causes the shaft to move relative the putty 28 and the shaft 30. If the shaft 30 is held stationary, the rate of rotation of the shaft 22 is controlled so that it revolves at a slow, generally constant speed. However, if the shaft 30 is permitted to revolve, its movement is related to the movement of the shaft 22 depending upon the speed of the shaft 22.

Considering the structure of FIG. 1 in greater detail, the damping liquid or putty 28 may comprise various non-Newtonian substances as those termed "bouncing putty" or "silicone putty," one form of which is a silicone putty available from the General Electric Company and identified by their product number SS-91. This material is a non-Newtonian liquid which may be incorporated in various systems of the present invention; however, other liquids and finely-divided particle solids acting as non-Newtonian liquids may also be employed.

The putty 28 in FIG. 1 is contained in the varying-diameter cavity 26 which enlarges in diameter at the top to resemble a truncated cone with the base remote the end of the shaft 30. The putty 28 in the cavity 26 provides rigid coupling between the shaft 22 and the shaft 30 if one of these shafts is relatively-rapidly rotated; however, when the shaft 30 for example is held stationary and the shaft 22 is urged to rotate, the putty 28 permits movement between the two only at a slow, controlled rate. As a result, if the shaft 30 is rigidly fixed, a force applied to the shaft 22 revolves it at a controlled rate.

The coupling between the shafts 22 and 30 is somewhat dependent upon the area of engagement between the shafts and the putty 28. Therefore, in some instances it is advisable to provide temperature compensating means to maintain the coupling relatively constant over a wide temperature range. One exemplary means for accomplishing temperature compensation is shown in FIG. 1. A mercury reservoir 34 is connected by a capillary tube 36 to the cavity 26. Mercury 37 is then contained in the reservoir 34 and the lower portion of the cavity 26. Now, as the temperature increases, the mercury expands moving the putty 28 upward in the decreasing-diameter cavity 26. As a result, temperature increases which reduced the viscosity of the liquid or putty 28 are compensated by placing more of the putty in contact with the shafts. Of course, a similar consideration applies for reduced temperatures during which the putty 28 is lowered in the cavity 26 to result in a smaller thickness and less contacted surface.

It is to be noted, that the top of the cavity 26 is closed by a felt pad 38 which is saturated with white oleic acid or a similar liquid softener for the putty 28 to preserve the putty a consistent liquid. In this regard, consistent operation has also been obtained by reducing the putty to the basic resin and polymer in equilibrium with monomer with no softener. That is, in such an arrangement, no oleic acid or other softener was applied and the substance remained adequately constant in consistency for reliable operation through a test period of many months. However, in an alternative arrangement as shown in FIG. 1, the substance may be used in various prepared forms with the pad 38 providing a minute quantity of softener to prevent hardening.

Figure 2:
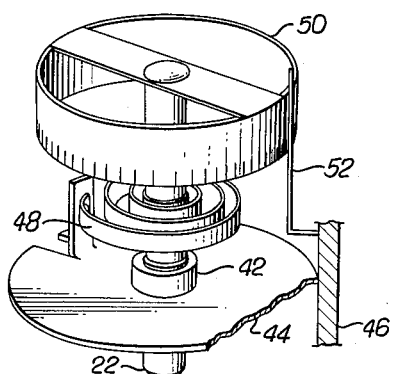
FIG. 2 is a perspective view of a timing system incorporating the escapement mechanism of FIG. 1.

In considering the manner in which the apparatus of FIG. 1 is incorporated in an actual timing unit, reference will now be had to FIG. 2 wherein the shaft 30 is locked against rotation by a disk 39 which is affixed to a rigid reference member 40. The shaft 22 extends from above the shaft 30 and is supported in a bearing 42 fixed in a disk 44 which is held on a rigid reference member 46. The disk 44 also holds the exterior end of a flat coil spring 48, the interior end of which is attached to the shaft 22 which is concentric the coil spring. At the top the shaft 22 a cylindrical dial 50 is mounted concentric the shaft so as to move relative to a pointer 52 held stationary on the member 46.

In the operation of the system, the dial 50 is revolved (as by hand) in a counterclockwise direction to wind the spring 48. The dial 50 is then released so that the spring applies a force to the shaft 22 urging it in a clockwise direction. The shaft 22 is freely rotatable in the bearing 42; however, the engagement of the shaft end 24 with the damping putty 28 allows the shaft 22 to turn only at a slow controlled rate. Therefore, the energy stored in the spring 48 is released at a controlled rate to revolve the shaft 22 and the dial 50 at a regulated rate past the pointer 52, thus performing a timing operation.

As it relates to the prior art, the system of FIG. 2 may be adapted for various uses as interval timers, clocks, or meters. In general, such apparatus are accomplished by providing a container for the damping putty which container also receives a mechanical member to which a force is applied, tending to drive the mechanical member relative to the container or the damping putty. As the container is fixed the rate of movement for the mechanical member is controlled.

The actual phenomena occurring in the damping putty is not fully and completely understood; however, the results of tests with operating models have borne out that extremely-accurate results can be obtained in timing devices incorporating escapements as shown in FIGS. 1 and 2.

Figure 3:
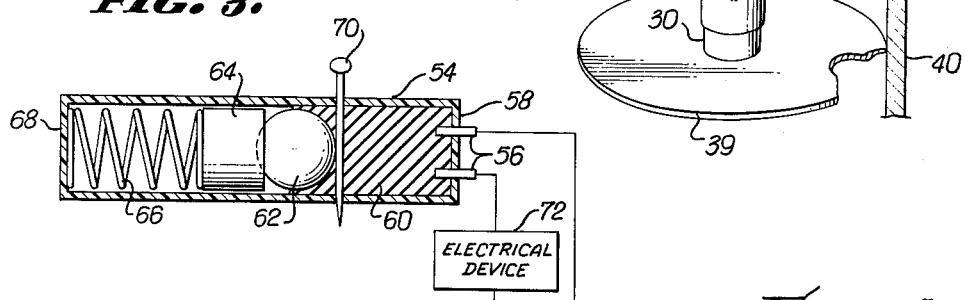
FIG. 3 is a sectional and diagrammatic view of a time-delay apparatus constructed in accordance with the principles of the present invention.

Another embodiment of a timing or delay apparatus constructed in accordance with the present invention is shown in FIG. 3 and will now be considered in detail. A closed-housing cylinder 54 contains a pair of electrical contacts 56 affixed in one end 58 thereof. The end 58 is formed of non-conductive material, e.g. plastic, and in the exemplary system of FIG. 3 the remainder of the cylinder 54 is integrally formed of the same material. Adjacent the contacts 56 and filling a considerable portion of the cylinder 54 is a body 60 of damping fluid or substance as described above. The body 60 of damping substance is held in position by a ball 62 which is loosely fitted into the cylinder 54 and partially contained in a concave end of a temperature-compensating cylindrical piston 64. The opposed flat end of the piston 64 engages a helical spring 66 which extends to the other end 68 of the closed cylinder 54. In this arrangement, the piston 64 and the ball 62 are urged to the right by the spring 66; however, they are restrained against moving in that direction by a pin 70 extending through ports at diametrically-opposed locations in the cylinder 54 to act as a lock holding the members fixed until released.

The ball 62 is formed of brass or other conductive material while the piston 64 comprises a material having a thermal coefficient of expansion in conjunction with the material of the cylinder 54 so that with temperature increases of the apparatus, the space between the piston 64 and the cylinder 54 decreases, and similarly increases with decreases of temperature. Various plastic materials having a positive thermal coefficient of expansion are satisfactory as exemplary material for the piston 64.

The function of the system of FIG. 3 is to close the electrical contacts 56 a predetermined interval after the pin 70 is removed, to thereupon actuate an electrical device 72. Of course, the electrical device may comprise an entire range of structures including, for example, a detonator for explosive, a control system which is to be rendered effective after a predetermined delay interval, or a variety of other systems.

Upon withdrawal of pin 70, the ball 62 is permitted to move to the right, driven by the spring 66 to pass through the piston 64. However, the body 60 of damping putty prevents rapid movement of the ball 62 through the cylinder 54. Rather, the putty permits the ball 62 to move slowly as it is displaced around the ball 62 and the piston 64 into the portion of the cylinder 54 containing spring 66. After a controlled interval of delay, the ball 62 engages the contacts 56, closing these contacts and rendering the electrical device 72 operative. Again, it is to be noted, that the system incorporates a contained body of damping putty and a mechanical member in the form of the ball 62 which is moved relative to the damping putty at a controlled rate.

As for temperature changes of the structure of FIG. 3, which vary the flow rate of the putty, these are compensated by varying the sectional area of the space through which the putty flows as described above. That is, temperature incurred changes in viscosity of the damping substance are compensated by temperature-responsive size variations in the cylinder 54 and the piston 64.

To employ the present invention as a transmission or energy-coupling system, various structures may be utilized. Considering one exemplary structure, reference will now be had to FIG. 4. A drive unit 75 turns a shaft 76, and may take the form of various engines or motors. The right end of the drive shaft 76 (remote the drive unit 75) carries a pair of concentrically-mounted disks 78 which are spaced apart and contained within a housing cylinder 80 also containing a body 79 of the damping substance as described. The cylinder is closed except at a concentric end port 81 through which the drive shaft 76 passes. The port 81 carries an O-ring 82 to seal the interior of the cylinder 80 closed while permitting the shaft 76 to revolve.

The cylinder 80 is integrally formed with a driven shaft 84 which is coupled to a driven unit 86 which may comprise any sink for mechanical energy.

In the operation of the system, energy from the drive unit 75 is applied to the driven unit 86 at a controlled rate through the body 79 of damping substance. Thus, the system comprises a mechanical transmission which is extremely simple and essentially free of maintenance. In operation of the transmission, the drive unit 75 first revolves the shaft 76 at low speeds turning the disks 78. At such speeds, the body 79 of substance permits considerable slip between the disks 78 and the cylinder 80. That is, in view of the slow movment of the disks 78 (relative the cylinder 80) the body 79 of the damping substance acts as a fluid and permits relative motion with little resistance. Now, as the speed of the drive unit increases along with the speed of the driven unit 86, the body 79 of damping putty becomes somewhat rigid to rapid changes, thereby tightly coupling the shaft 76 to the shaft 84. Further increases in speed result in an essentially rigid coupling between the shafts 76 and 84 so that the drive unit turns the driven unit at full and equal speed.

Considering this application of the present invention, the drive unit 75 may take the form of an internal combustion engine while the driven unit 86 may be the wheels of a motor vehicle. In such an instance, while the engine is idling at a slow speed, the disks 78 revolve relative to the cylinder 80 with no intercoupling. However, as the speed of the engine is increased, the drive unit is more rigidly coupled to the wheels so that load is gradually applied to the motor.

Figure 4:
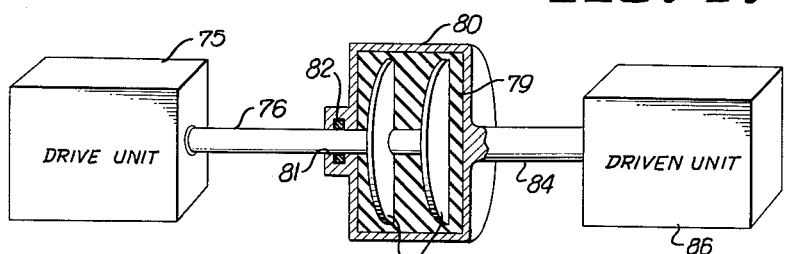
FIG. 4 is a diagrammatic and sectional view of an escapement transmission mechanism constructed in accordance with the principles of the present invention.

The apparatus of FIG. 4 is a rather simple embodiment of the present invention as utilized for a transmission. However, a somewhat more elaborate system is shown in FIG. 5 and will now be considered in detail.

Figure 5:
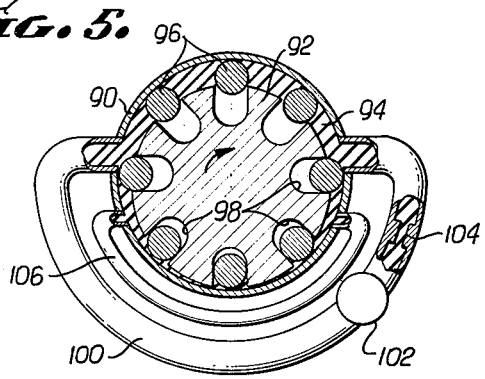
FIG. 5 is a sectional view of another escapement transmission constructed in accordance with the principles of the present invention.

The energy transmission of FIG. 5 is shown by a vertical section through a cylinder 90 containing a rotary piston 92 which is axially offset (eccentric) from the cylinder; however, which extends essentially the full interior length of the cylinder 90. The cylinder 90 and the piston 92 are connected respectively to shafts (not shown) which may in turn be connected to a drive unit and a driven unit as shown in FIG. 4. The shaft connected to the piston 92 passes into the cylinder 90 through a seal which may be similar the O-ring, again as shown in FIG. 4.

The space between the piston 92 and the interior of the cylinder 90 contains a body 94 of damping putty as previously described. This space also receives rollers 96 which dwell in mating elongate slots 98 in the piston 92 which are parallel the axis of the piston and disposed about the curved surface thereof. The rollers 96 are of a diameter sufficient to contact the interior of the cylinder 90 while rotating in the piston yet may be fully contained in the slots 98.

The tapering sections of the space between the piston 92 and the cylinder 90 are connected by ducts or flow paths through which the damping substance may be forced. The outside duct 100 contains a valve 102 and an orifice 104. The inside duct 106 is a uniform passage.

The valve 102 in the duct 100 may take various forms and variously closes the passage to control the rigidity of coupling between the piston 92 and the cylinder 90, as well as the shafts which are connected to these members. The orifice 104 serves to maintain the operation of the transmission somewhat constant with temperature variations by varying as the viscosity of the substance. In structure, the orifice 104 is formed of temperature-responsive material which varies the sectional area of the orifice inversely as temperature. Many such materials are well-known in the prior art; and specifically, as the temperature increases rendering the damping putty less viscous, the material forming the orifice 104 expands to reduce the area of the orifice. Conversely, upon a decrease in temperature, the diameter or sectional area of the orifice increases to prevent less resistance to the more viscous damping substance. Of course, various damping or non-Newtonian substances may be used in the embodiments hereof which have the characteristic of resilient deformation to sudden change, but permanent deformation to slow change, i.e. rapid deformation is resilient, slow deformation is not. Specific examples are as follows.

Considering the operation of the system of FIG. 5, as the piston 92 is driven at a slow rate relative the cylinder 90, the rollers 96 dwell completely within the slots 98 so that mere surface engagement of the cylinder 92 and the body 94 with the damping substance permits relatively free movement. Now, as the speed of the rotary piston 92 is increased, in addition to the coupling effect described with reference to FIG. 4, the centrifugal force of the revolving movement urges the rollers 92 out of the slots 98 as they travel across the upper portion of the cylinder 90 and therefore the damping substance is forced across the cylinder 90, trapped in an ever-reducing space, and pushed through the duct 100 to be returned to the other side of the cylinder 90. The small remaining portion of the damping substance is forced through the duct 106 to be also returned to the other side of the cylinder. Of course, as the speed increases, the rigidity of the damping substance also increases so that a tighter coupling exists between the cylinder and the piston. However, this coupling is greatly tightened by the rollers 96. Of course, the coupling may be rendered completely rigid by closure of the valve 102 which prevents the flow of any of the damping substance through the valve contained in the duct 100.

In considering the system of FIG. 5 it is readily apparent that a rather simple, trouble free transmission having fine control may be provided with the present invention and which transmission will require very little maintenance to be preserved operative.

Of course, other features of the present invention reside in the simplicity of various structures which may be accomplished to control and constantly regulate relative motion.

It should be noted that although the particular embodiments of the invention herein shown and described are fully capable of providing the advantages and achieving the objects previously set forth, such embodiments are merely illustrative of this invention and therefore modifications and changes may be made thereto without departing from the spirit of the invention or the scope of the following claims.

What is claimed is:
1. A mechanical escapement comprising:
a first drive element;
a container means affixed to said first drive element;
a quantity of viscous damping putty contained in said container means;
a second drive element engaging said damping putty;
means for applying a torque between said first drive element and said second drive element; and
means for varying the degree of coupling between said first drive element and said second drive element accomplished through said damping putty including a temperature responsive means for retracting said damping putty from said container means upon decreases in temperature and returning said damping putty to said container means upon increases in temperature.

2. An escapement in accordance with claim 1 wherein said viscous damping putty comprises a non-Newtonian liquid.

3. An escapement according to claim 1 wherein said means for varying the degree of coupling comprises means contacting said viscous damping putty, which means affords a variable contact surface to engage said viscous damping putty, said means being connected to one of said drive elements whereby to control the degree of coupling between said first drive element and said second drive element.

4. An escapement according to claim 3 wherein said means for applying torque comprises a mechanical spring energy storage means.

5. An escapement according to claim 3 wherein said means contacting said viscous damping putty is temperature controlled whereby to afford a variable contact surface in accordance with variable temperature.

References Cited by the Examiner

UNITED STATES PATENTS

| | | | |
|---|---|---|---|
| 2,569,311 | 9/1951 | Hoare et al. | 188—90 |
| 2,833,347 | 5/1958 | Terry | 188—100 |
| 3,033,316 | 5/1962 | Foster | 185—37 |
| 3,045,076 | 7/1962 | Gaylord | 200—34 |
| 3,064,454 | 11/1962 | Sharples | 64—28 |
| 3,111,823 | 11/1963 | Kater | 64—28 |
| 3,112,814 | 2/1963 | Pasqua | 188—37 |
| 3,118,027 | 1/1964 | Boyles | 200—34 |

BENJAMIN HERSH, *Primary Examiner.*

EUGENE G. BOTZ, *Examiner.*

H. R. FIELD, M. S. SALES, *Assistant Examiners.*